United States Patent [19]

Drake et al.

[11] Patent Number: 6,034,020
[45] Date of Patent: Mar. 7, 2000

[54] ZEOLITE-BASED CATALYST MATERIAL, THE PREPARATION THEREOF AND THE USE THEREOF

[75] Inventors: Charles A. Drake, Nowata; An-hsiang Wu, Bartlesville, both of Okla.

[73] Assignee: Phillips Petroleum Company, Bartlesville, Okla.

[21] Appl. No.: 09/222,469

[22] Filed: Dec. 29, 1998

[51] Int. Cl.[7] .............................. B01J 29/04; B01J 29/06; B01J 21/00; C07C 15/00; C10G 35/06
[52] U.S. Cl. ................. 502/60; 502/64; 502/71; 502/77; 502/81; 585/415; 208/136
[58] Field of Search .................. 502/60, 64, 71, 502/77, 81; 585/415; 208/136

[56] References Cited

U.S. PATENT DOCUMENTS

| | | | |
|---|---|---|---|
| 3,860,533 | 1/1975 | Young | 252/455 Z |
| 4,036,739 | 7/1977 | Ward | 208/120 |
| 4,441,990 | 4/1984 | Huang | 208/111 |
| 4,735,928 | 4/1988 | Best et al. | 502/65 |
| 4,804,801 | 2/1989 | Yan | 585/407 |
| 4,918,256 | 4/1990 | Nemet-Mavrodin | 585/415 |
| 4,954,243 | 9/1990 | Kuehl et al. | 208/120 |
| 5,500,108 | 3/1996 | Durand et al. | 208/89 |
| 5,776,852 | 7/1998 | Wu et al. | 502/177 |
| 5,804,059 | 9/1998 | Wu et al. | 208/135 |
| 5,827,422 | 10/1998 | Drake et al. | 208/135 |
| 5,866,741 | 2/1999 | Wu et al. | 585/475 |
| 5,866,742 | 2/1999 | Wu et al. | 585/475 |
| 5,866,744 | 2/1999 | Wu et al. | 585/486 |
| 5,883,033 | 3/1999 | Drake et al. | 502/68 |

*Primary Examiner*—Gary P. Straub
*Assistant Examiner*—Cam N. Nguyen
*Attorney, Agent, or Firm*—Archie W. Umphlett

[57] ABSTRACT

A process for producing catalyst compositions for converting a cracked gasoline feedstock to a product that is principally lower olefins. The catalyst compositions produced thereby. A process for converting a cracked gasoline feedstock to a product that is principally lower olefins.

14 Claims, No Drawings

ZEOLITE-BASED CATALYST MATERIAL, THE PREPARATION THEREOF AND THE USE THEREOF

BACKGROUND OF THE INVENTION

The invention relates to a process for increasing the conversion of a cracked gasoline feedstock to ethylene and propylene in the presence of an improved zeolite-based catalyst material.

It is known to catalytically crack non-aromatic gasoline boiling range hydrocarbons, particularly hydrocarbons such as paraffins and olefins, to lower olefins (such as ethylene and propylene) and aromatic hydrocarbons (such as benzene, toluene and xylenes) in the presence of catalysts which contain a zeolite (such as ZSM-5), as is described in an article by N.Y. Chen et al. in Industrial & Engineering Chemistry Process Design and Development, Volume 25, 1986, pages 151–155. The reaction products of the catalytic cracking processes contain a multitude of hydrocarbons such as unconverted $C_5+$ alkanes, lower alkanes (methane, ethane, propane). lower alkenes (ethylene and propylene), $C_6$–$C_8$ aromatic hydrocarbons (benzene, toluene, xylenes and ethylbenzene) and $C_9+$ aromatic hydrocarbons. It can be desirable to further process the product from a catalytic gasoline cracking operation to increase the yield of compounds that, in a current market, are relatively more valuable than other products of gasoline cracking. The cracking operation yield of lower olefins (such as ethylene, propylene and butenes) can be increased using the improved zeolite catalyst compositions of this invention.

SUMMARY OF THE INVENTION

It is an object of this invention to at least partially convert hydrocarbons to ethylene, propylene and butenes.

It is another object of this invention to provide a hydrocarbon conversion process that tends to increase the conversion of hydrocarbons to lower olefins while decreasing the conversion to lower paraffins.

Another object of this invention is to provide an improved zeolite-based catalyst that on being utilized in the conversion of hydrocarbons gives an improved yield of lower olefins.

A further object of this invention is to provide a method for making an improved zeolite-based catalyst that on being utilized in the conversion of hydrocarbons yields a product having an improved yield of lower olefins and BTX aromatics.

The inventive compositions are those made by a preparation scheme in which a molybdenum compound has been added to an acid leached zeolite with the resulting molybdenum-containing zeolite composition subjected to a subsequent steam treatment. Hydrocarbons can be converted to lower olefins by subjecting a hydrocarbon feedstock to conversion conditions in the presence of the inventive compositions.

Other objects and advantages of the invention will become apparent from the detailed description and the appended claims.

DETAILED DESCRIPTION OF THE INVENTION

The Zeolite

The zeolite material used in making the inventive compositions of this invention can be any zeolite which when contacted with non-aromatic hydrocarbons under suitable operating conditions is effective in the conversion of non-aromatic hydrocarbons to aromatic hydrocarbons. Preferably, the zeolite has a constraint index (as defined in U.S. Pat. No. 4,097,367, which is incorporated here by reference) in the range of about 0.4 to about 12, more preferably about 2 to about 9. Generally the molar ratio of $SiO_2$ to $Al_2O_3$ in the crystalline framework of the zeolite is at least about 5:1 and can range up to infinity. Preferably the molar ratio of $SiO_2$ to $Al_2O_3$ in the zeolite framework is about 8:1 to about 200:1, more preferably about 12:1 to about 100:1. Preferred zeolites include ZSM-5, ZSM-8, ZSM-11, ZSM-12, ZSM-35, ZSM-38 and mixtures thereof. Some of these zeolites are also known as "MFI" or "Pentasil" zeolites. The presently most preferred zeolite is ZSM-5.

The zeolite can be used directly, as received from the manufacturer, or it can be subjected to a heat treatment, following the conditions set out below, before being used in the preparation of a catalyst by the first embodiment of this invention. In the heat treatment, if employed, the zeolite is exposed, by any suitable method known in the art, to a gas atmosphere under temperature and pressure conditions and for a period of time that is suitable to provide a desired heat treated product.

The gas used in the heat treatment of the acid treated zeolite can be selected from the group consisting of inert gases (nitrogen, helium, argon and the like), reducing gases (carbon monoxide, hydrogen and the like), air, oxygen and steam. The preferred gas is selected from among air, oxygen, nitrogen, steam and mixtures thereof. Most preferably, the treatment gas is selected from among air, oxygen, nitrogen and mixtures of two thereof. Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 250° C. to about 800° C. Preferably, this temperature range is from about 350° C. to about 700° C. and, most preferably, the temperature of this heat treatment is in a range of about 450° C. to about 600° C.

The time period for conducting this heat treatment must be sufficient to provide a material that is substantially dry, i.e., free of water. Generally, the period of time during which the acid treated zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours.

A critical aspect of the process of this invention is the use of a catalyst containing a zeolite material that has been treated with an acid. As used in this specification and in the claims, the term "acid treated zeolite", or "acid leached zeolite", is defined as a zeolite starting material that has been treated with an acid.

According to this invention any suitable means or method can be used to treat the zeolite starting material with acid. It is preferred for the zeolite to be soaked in an acid solution by any suitable means known in the art for contacting the zeolite with such acid solution. The acid solution used to treat the zeolite can be a solution of any acid that provides leaching of aluminum atoms from the zeolite particles. Preferably, the acid concentration in this solution is about 1–10 equivalents per liter. Sulfuric, phosphoric, nitric and hydrochloric acids are among the acids suitable for treating the zeolite. The preferred acid solution is aqueous hydrochloric acid. The zeolite is soaked in the acid solution (preferably at a temperature within the range of about 50–100° C.) for a period of up to about 15 hours, but, preferably, in a range of about 0.1 hour to about 12 hours. The acid treated zeolite resulting from the soaking is washed free of the acid.

After the acid treated zeolite is washed free of the acid, the resulting product is exposed, by any suitable method known in the art, to a gas atmosphere under temperature and pressure conditions and for a period of time that is suitable to provide a desired heat treated product. These conditions of temperature and pressure and the period of time of treatment are the same as set out above in the discussion of the heat treatment of a zeolite that is to be used without acid treatment.

Addition of Molybdenum

After the heat treatment, if employed, the washed, acid treated zeolite is further treated to provide a molybdenum-containing catalyst composition. The molybdenum can be incorporated into, in accordance with this invention, a zeolite that has been acid leached. Any suitable means for incorporating metallic elements into a substrate material can be used. A preferred method of incorporation is the use of any incipient wetness technique for impregnating the acid leached zeolite substrate with the metal. This preferred method uses a liquid impregnation solution containing the desired concentration of molybdenum to ultimately provide a final catalyst composition having the desired concentration of molybdenum.

As used herein, the term "molybdenum" refers to elemental molybdenum, inorganic molybdenum compounds, organic molybdenum compounds and mixtures of any two or more thereof. Suitable molybdenum-containing compounds include, but are not limited to, molybdenum chloride, molybdenum acetate, molybdenum fluoride, molybdenum hexacarbonyl, molybdenum sulfide, sodium molybdates, potassium molybdates, molybdenum oxychloride, molybdenum sulfide, ammonium tetrathiomolybdate, ammonium molybdate, ammonium dimolybdate, ammonium heptamolybdate, molybdenum oxides in which the oxidation state of Mo can be 2, 3, 4, 5, and 6, and combinations of two or more thereof. Inorganic molybdenum compounds are particularly preferred. The most preferred molybdenum compound is ammonium heptamolybdate.

Molybdenum is incorporated into the zeolite to form a mixture of zeolite and molybdenum. The molybdenum can be incorporated into the zeolite by any suitable means or method known in the art for incorporating metallic elements into a substrate material. One method is to mix the zeolite with at least one anhydrous molybdenum compound, followed by a heat treatment preferably at about 700–800° C. for about 1–10 hours in an inert gas stream. Another method, presently preferred for impregnating zeolite that has not been acid leached, uses a liquid impregnation solution containing a concentration of molybdenum sufficient to ultimately provide the final inventive composition with the concentration of molybdenum in the required range. Yet another method for incorporating molybdenum into an acid leached zeolite, uses an ion exchange technique to provide an amount of incorporated molybdenum in the required range.

If molybdenum is incorporated into the zeolite with an aqueous solution of a molybdenum compound, the preferred impregnation solution is an aqueous solution formed by dissolving a molybdate (preferably ammonium molybdate) in water. The molybdenum-impregnated, acid treated zeolite is then steam treated, preferable at about 500–800° for about 1–10 hours.

For the incorporation of molybdenum into the acid treated zeolite any suitable molybdenum salt can be mixed with the zeolite and the molybdenum salt/zeolite mixture then washed with an aqueous solution of a suitable ion exchange agent, preferably IM ammonium nitrate ($NH_4NO_3$). The washed catalyst is then filtered, washed with deionized water, dried and, preferably, calcined to obtain molybdenum-incorporated zeolite.

The amount of molybdenum incorporated or impregnated into the acid leached zeolite should provide a concentration effective to assure predetermined olefin conversion yields employing the catalyst composition in the conversion of a hydrocarbon feedstock. Generally, the weight percent of molybdenum present in the impregnated acid treated zeolite is in a range of up to about 10 weight percent of the impregnated acid treated zeolite. The preferred concentration of molybdenum in the impregnated acid treated zeolite is in the range of about 0.05 to about 8 weight percent and, more preferably, from about 0.1 to about 6 weight percent.

The molybdenum impregnated zeolite is subjected to a steam treatment in which the molybdenum impregnated acid treated zeolite is contacted with a water vapor saturated stream of gas for a period of time at an elevated temperature to produce a steam treated molybdenum impregnated acid treated zeolite. The carrier gas for the water vapor is a gas that is inert in the presence of water to the components of the catalyst. A preferred carrier gas is helium. The period of contact can be in the range of up to about 24 hours, preferably about 1 to about 15 hours and more preferably about 2 to about 12 hours. The temperature of the steam treatment can be in the range of about 575° C. to about 675° C., more preferably about 600° C. to about 650° C.

The steam treated molybdenum impregnated acid treated zeolite can be subjected to heat treating by which it is exposed by any suitable method known in the art to a gas atmosphere under temperature and pressure conditions and for a period of time to provide a desired heat treated material. The gas used in the heat treatment of the acid treated zeolite can be selected from the group consisting of inert gases (nitrogen, helium, argon and the like), reducing gases (carbon monoxide, hydrogen and the like), air, oxygen and steam. The preferred gas is selected from among air, oxygen, nitrogen, steam and mixtures thereof. Most preferably, the treatment gas is selected from among air, oxygen, nitrogen and mixtures of two thereof.

Generally, this heat treatment can be conducted at a pressure in a range from below atmospheric pressure to about 1000 pounds per square inch absolute (psia). More typically, however, the pressure range is from about atmospheric to about 100 psia. The temperature of this heat treatment is generally in the range of about 500° C. to about 1000° C. Preferably, this temperature range is from about 600° C. to about 900° C. and, most preferably, the temperature of this heat treatment is in a range of about 650° C. to about 850° C.

The time period for conducting this heat treatment must be sufficient to provide a material that is substantially dry, i.e., free of water. Generally, the period of time during which the acid treated zeolite is exposed to treating gas at appropriate conditions of temperature and pressure can range from about 0.1 hour to about 30 hours. Preferably, this heat treatment is conducted for a time period in the range of about 0.25 hour to about 20 hours and, most preferably, from about 0.5 hour to about 10 hours.

The process of this invention applies most specifically to the conversion of cracked hydrocarbon feedstocks to lower olefins. The preferred feedstocks of this invention are cracked hydrocarbon feedstocks from the catalytic cracking (e.g., fluidized catalytic cracking and hydrocracking) of gas oils and the thermal cracking of light hydrocarbons, naphthas, gas oils, reformates and straight-run gasoline. The cracked gasoline feedstock generally comprises hydrocarbons containing 2–16 carbon atoms per molecule chosen from among paraffins (alkanes) and/or olefins (alkenes) and/or naphthenes (cycloalkanes). The most preferred feedstock for processes of this invention is a cracked gasoline derived from the fluidized catalytic cracking of gas oil, suitable for use as at least a gasoline blend stock generally having a boiling range of from about 80° F. to about 430° F. The boiling range of the cracked hydrocarbon feedstock is determined by the standard ASTM method for measuring the initial boiling point and the end-point temperatures. Generally the content of paraffins exceeds the combined content of olefins, naphthenes, and aromatics (if present). The process of this invention is principally directed to the aromatization of a cracked hydrocarbon feedstock. It is specifically noted that the alkylation of aromatic compounds is substantially absent because either the reaction does not take place or insubstantial quantities of aromatics are present in the feedstock in the process of this invention.

Cracked hydrocarbon feedstock and the catalyst composition can be contacted within a reaction zone in any suitable manner. The contacting can be operated as a batch process or, preferably, as a continuous process. In a continuous process a solid catalyst bed, a moving catalyst bed or a fluidized catalyst bed can be employed. Each of these modes of operation has known advantages and disadvantages so that one skilled in the art can select the mode most suitable for a particular feedstock and catalyst.

Contacting the hydrocarbon feedstock and the catalyst composition is preferably carried out in a conversion reaction zone which contains the catalyst composition employing reaction conditions that promote the formation of olefins, preferably light olefins, and aromatics, preferably BTX, from at least a portion of the hydrocarbons in the cracked hydrocarbon feedstock. The reaction temperature employed in the contacting is in the range of from about 400° C. to about 900° C., preferably, from about 500° C. to about 800° C. and, more preferably, from 600° C. to about 700° C. The pressure employed in the contacting can range from subatmospheric up to about 500 psia and, preferably, from about atmospheric to about 400 psia.

The flow rate at which the cracked hydrocarbon feedstock is charged to the conversion reaction zone for contact with the catalyst composition is selected to provide a weight hourly space velocity (WHSV) in a range having an upward limit of about 1000 hour$^{-1}$. The term "weight hourly space velocity", as used herein, shall mean the numerical ratio of the rate at which a cracked hydrocarbon feedstock is charged to the conversion reaction zone in pounds per hour divided by the pounds of catalyst contained in the conversion reaction zone to which the hydrocarbon is charged. The preferred WHSV of the feed to the conversion reaction zone, or contacting zone, can be in the range of from about 0.25 hour$^{-1}$ to about 250 hour$^{-1}$ and, more preferably, from about 0.5 hour$^{-1}$ to about 100 hour$^{-1}$.

The following examples are presented to further illustrate this invention and are not to be construed as unduly limiting its scope.

EXAMPLE I

This example illustrates the preparation of catalysts which were subsequently tested as catalysts in the conversion to ethylene, propylene and butenes of a gasoline sample, which had been produced in a commercial fluidized catalytic cracking unit (FCC).

Catalyst A (Control)—Steam Treated Acid Treated Zeolite

A 50 gm quantity of a commercially available ZSM-5 catalyst provided by United Catalysts Inc. of Louisville, Ky. under their product designation "T-4480" was soaked in an approximately 6N aqueous HCL solution for two hours at a constant temperature of about 90° C. After soaking, the catalyst was separated from the acid solution and thoroughly washed with deionized water and dried. The acid leached, washed and dried catalyst was calcined at 525° C. for 4 hours to provide 35.9 grams of acid leached zeolite. The acid leached zeolite was then contacted for 6 hours at 500° C. with a 50 ml/min stream of He saturated with $H_2O$. Subsequently, the steam treated acid leached zeolite was calcined by contact with He at 538° C. for 6 hours.

Catalyst B (Invention)—Steam Treated Molybdenum Impregnated Acid Treated Zeolite A quantity of 10.59 grams of the steam treated acid treated zeolite produced as Catalyst A was mixed with 8.84 grams of a solution of 6 wt. percent hydrated ammonium heptamolybdate $((NH_4)_6$ mixture washed with 60 grams of an aqueous 1 M ammonium nitrate $(NH_4NO_3)$ solution. and the mixture was then contacted for 6 hours at 500° C. with a 50 ml/min stream of He saturated with $H_2O$. Subsequently, the steam treated acid leached zeolite was calcined by contact with He at 538° C. for 6 hours.

EXAMPLE II

This example illustrates the use of the Zeolite materials described in Example I as catalysts in the conversion of a gasoline feed to lower olefins (ethylene, propylene and butenes).

For each of the test runs, a 5.0 g sample of the catalyst materials described in Example I was placed into a stainless steel tube reactor (length: about 18 inches; inner diameter: about 0.5 inch). Gasoline boiling range feedstock from a catalytic cracking unit of a refinery was passed through the reactor at a flow rate of about 14 ml/hour, at a temperature of about 600° C. and at atmospheric pressure (about 0 psig). The formed reaction product exited the reactor tube and passed through several ice-cooled traps. The liquid portion remained in these traps and was weighed. The volume of the gaseous portion which exited the traps was measured in a "wet test meter". Liquid and gaseous product samples (collected at hourly intervals) were analyzed by means of a gas chromatograph. Results of the test runs for Catalysts A and B are summarized in Table I. All test data were obtained for about 8 hours on stream.

TABLE 1

Olefin Yield from Gasoline Upgrade

| | Wt. % of Gaseous Yield | | | | | | | $C_2^=$, $C_3^=$, & $C_4^=$, as Wt. % of |
|---|---|---|---|---|---|---|---|---|
| Catalyst | $C_1$ | $C_2$ | $C_3$ | $C_4$ | $C_2^=$ | $C_3^=$ | $C_4^=$ | Gaseous Yield |
| A(Comp.) | 2.2 | 2.0 | 3.0 | 1.4 | 11.1 | 15.6 | 6.3 | 79 |
| B(Inv.) | 1.2 | 1.1 | 1.5 | 0.7 | 7.1 | 15.4 | 6.6 | 87 |

The test data presented in Table 1 show that the invention catalyst B of this invention produced a gaseous yield with olefins—ethylene, propylene and butenes—in an amount sufficiently high and produced paraffins—methane, ethane, propane and butane—in an amount sufficiently low in comparison to the gaseous yield using comparison catalyst A to provide a gaseous product having 8 percent more of the more economically desirable olefins. The lower amount of paraffins produced means less material needs to be recycled which would reduce production costs. The minimized production of low value methane is another economic advantage of the invention.

Reasonable variations, modifications and adaptations can be made within the scope of the disclosure and the appended claims without departing from the scope of this invention.

That which is claimed is:

1. A method for preparing a catalyst composition consisting essentially of:
   (A) acid leaching a ZSM-5 zeolite;
   (B) impregnating a molybdenum compound into the acid leached zeolite to provide a molybdenum impregnated acid leached zeolite;
   (C) steam treating the molybdenum impregnated acid leached zeolite to provide a steam treated molybdenum impregnated acid leached zeolite and
   (D) calcining the steam treated molybdenum impregnated zeolite to provide a calcined steam treated molybdenum impregnated acid leached zeolite.

2. A method according to claim 1 for preparing a catalyst composition wherein acid leaching the zeolite comprises treating the zeolite with an acid, washing the acid treated zeolite to substantially remove the acid and subsequently calcining the washed, acid treated zeolite thereby providing a calcined acid leached zeolite.

3. A method according to claim 2 for preparing a catalyst composition wherein the acid leached zeolite is impregnated to incipient wetness with the molybdenum compound thereby providing a molybdenum impregnated acid leached zeolite.

4. A method according to claim 3 for preparing a catalyst composition wherein the molybdenum compound is chosen from the group consisting of molybdenum chloride, molybdenum acetate, molybdenum fluoride, molybdenum hexacarbonyl, molybdenum sulfide, sodium molybdates, potassium molybdates, molybdenum oxychloride, molybdenum sulfide, ammonium tetrathiomolybdate, ammonium molybdate, ammonium dimolybdate, ammonium heptamolybdate, molybdenum oxides in which the oxidation state of Mo can be 2, 3, 4, 5, and 6, and combinations of two or more thereof.

5. A method according to claim 4 for preparing a catalyst composition wherein the molybdenum compound is hydrated ammonium heptamolybdate $((NH_4)_6Mo_7O_{24}.H_2O)$.

6. A method according to claim 4 for preparing a catalyst composition wherein the steam treating of the molybdenum impregnated acid leached zeolite comprises treating the molybdenum impregnated acid leached zeolite at 575° C.–675° C. in the presence of water vapor and a carrier gas inert to the catalyst components thereby providing a steam treated molybdenum impregnated acid leached zeolite.

7. A method according to claim 5 for preparing a catalyst composition wherein the steam treating of the molybdenum impregnated acid leached zeolite comprises treating the molybdenum impregnated acid leached zeolite at 575° C.–675° C. in the presence of water vapor and a carrier gas inert to the catalyst components thereby providing a steam treated molybdenum impregnated acid leached zeolite.

8. A method for converting a cracked gasoline feedstock to a product comprising lower olefins the method comprising contacting the cracked gasoline feedstock with a catalyst composition made according to the method of claim 1 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

9. A method for converting a cracked gasoline feedstock to a product comprising lower olefins the method comprising contacting the cracked gasoline feedstock with a catalyst composition made according to the method of claim 2 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

10. A method for converting a cracked gasoline feedstock to a product comprising lower olefins the method comprising contacting the cracked gasoline feedstock with a catalyst composition made according to the method of claim 3 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

11. A method for converting a cracked gasoline feedstock to a product comprising lower olefins the method comprising contacting the cracked gasoline feedstock with a catalyst composition made according to the method of claim 4 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

12. A method for converting a cracked gasoline feedstock to a product comprising lower olefins the method comprising contacting the cracked gasoline feedstock with a catalyst composition made according to the method of claim 5 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

13. A method for converting a cracked gasoline feedstock to a product comprising lower olefins the method comprising contacting the cracked gasoline feedstock with a catalyst composition made according to the method of claim 6 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

14. A method for converting a cracked gasoline feedstock to a product comprising lower olefins the method comprising contacting the cracked gasoline feedstock with a catalyst composition made according to the method of claim 7 under conditions sufficient to convert the cracked gasoline feedstock to a product comprising incremental aromatics and lower olefins said condition comprising reaction temperatures in a range from about 400° C. to about 900° C. and reaction pressures in a range from subatmospheric up to about 500 psia.

* * * * *